(12) United States Patent
Zhang et al.

(10) Patent No.: US 9,379,844 B2
(45) Date of Patent: Jun. 28, 2016

(54) METHOD AND SYSTEM FOR INDICATING AN ENABLED TRANSPORT BLOCK

(75) Inventors: Jianzhong Zhang, Irving, TX (US); Jin-Kyu Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 13/031,082

(22) Filed: Feb. 18, 2011

(65) Prior Publication Data

US 2011/0205988 A1    Aug. 25, 2011

Related U.S. Application Data (60) Provisional application No. 61/307,755, filed on Feb. 24, 2010, provisional application No. 61/308,222, filed on Feb. 25, 2010, provisional application No. 61/311,687, filed on Mar. 8, 2010.

(51) Int. Cl.
  *H04W 4/00* (2009.01)
  *H04L 1/00* (2006.01)
  *H04B 7/04* (2006.01)
  *H04L 1/06* (2006.01)
  *H04L 5/00* (2006.01)

(52) U.S. Cl.
  CPC ............ *H04L 1/0029* (2013.01); *H04B 7/0413* (2013.01); *H04L 1/0027* (2013.01); *H04L 1/0032* (2013.01); *H04L 1/06* (2013.01); *H04L 5/0053* (2013.01); *H04L 1/0003* (2013.01); *H04L 1/0009* (2013.01); *H04L 5/0023* (2013.01)

(58) Field of Classification Search
  CPC .......... H04W 72/042; H04W 72/0413; H04W 88/08; H04W 72/0406; H04W 72/04; H04W 72/0446; H04W 72/0453; H04W 88/02; H04W 24/10; H04W 52/146; H04W 72/1289
  USPC .......................... 370/328, 329, 342; 455/419
  See application file for complete search history.

(56) References Cited

U.S. PATENT DOCUMENTS

| | | |
|---|---|---|
| 2005/0141560 A1 | 6/2005 | Muthiah |
| 2009/0196262 A1 | 8/2009 | Chin et al. |
| 2009/0225737 A1* | 9/2009 | Kim et al. ..................... 370/342 |

(Continued)

FOREIGN PATENT DOCUMENTS

| | | |
|---|---|---|
| CN | 101039162 A | 9/2007 |
| WO | WO 2009/053933 A1 | 4/2009 |

OTHER PUBLICATIONS

International Search Report dated Oct. 27, 2011 in connection with International Patent Application No. PCT/KR2011/01292.

(Continued)

*Primary Examiner* — Melanie Jagannathan
*Assistant Examiner* — Najeeb Ansari (57) ABSTRACT

A base station is provided. The base station includes transmit path circuitry that generates an uplink grant using an uplink multiple-input multiple-output (MIMO) downlink control information (DCI) format. The uplink MIMO DCI format includes a modulation and coding scheme (MSC) field having an MCS value for each of two transport blocks. The transmit path circuitry transmits the uplink grant to a subscriber station. For a given transport block, a combination of the MCS value corresponding to the transport block and a number positive integer of physical resource blocks allocated to the subscriber station (N_PRB) indicates whether the transport block is disabled.

12 Claims, 9 Drawing Sheets

(56) References Cited

U.S. PATENT DOCUMENTS

| | | | |
|---|---|---|---|
| 2009/0257408 A1 | 10/2009 | Zhang et al. | |
| 2010/0034139 A1* | 2/2010 | Love et al. | 370/328 |
| 2010/0195614 A1* | 8/2010 | Nimbalker et al. | 370/330 |
| 2010/0238823 A1* | 9/2010 | Chen et al. | 370/252 |
| 2010/0248708 A1* | 9/2010 | Koivisto et al. | 455/419 |
| 2011/0103247 A1* | 5/2011 | Chen et al. | 370/252 |
| 2012/0057451 A1* | 3/2012 | Kim et al. | 370/216 |
| 2012/0057545 A1* | 3/2012 | Hariharan et al. | 370/329 |
| 2012/0170525 A1* | 7/2012 | Sorrentino | 370/329 |
| 2012/0182944 A1* | 7/2012 | Sorrentino et al. | 370/329 |
| 2012/0314678 A1* | 12/2012 | Ko et al. | 370/329 |
| 2013/0021898 A1* | 1/2013 | Kang et al. | 370/216 |
| 2013/0208705 A1* | 8/2013 | Ko et al. | 370/335 |

OTHER PUBLICATIONS

Written Opinion of the International Searching Authority dated Oct. 27, 2011 in connection with International Patent Application No. PCT/KR2011/01292.

Notice of Patent Grant for "Method and System for Indicating an Enabled Transport Block", Japanese Patent App. No. 2012-554930, Oct. 7, 2014, 5 pages.

3GPP TSG RAN WG1 #61 (R1-103322) "Further Discussions on UL MIMO Signaling requirements", Montreal, Canada, May 10-14, 2010, 4 pages.

3GPP TSG-RAN WG1 #60 (R1-101493) "UL grants for MIMO transmissions", San Francisco, USA, Feb. 22-26, 2010, 3 pages.

Translated Chinese Office Action dated Oct. 27, 2014 in connecton with Chinese Patent App. No. 2011800108843; 22 pages.

* cited by examiner

| UL TRANSMISSION MODE | DCI FORMAT | SEARCH SPACE | TRANSMISSION SCHEME OF PUSCH CORRESPONDING TO PDCCH |
|---|---|---|---|
| UL MODE 1 | DCI FORMAT 0 | COMMON AND UE SPECIFIC BY C-RNTI | SINGLE-ANTENNA PORT, CONTIGUOUS BW ALLOCATION |
| | DCI FORMAT 0A | UE SPECIFIC BY C-RNTI | SINGLE-ANTENNA PORT, NON-CONTIGUOUS BW ALLOCATION |
| UL MODE 2 | DCI FORMAT 0/0A | COMMON AND UE SPECIFIC BY C-RNTI | SINGLE-ANTENNA PORT, CONTIGUOUS OR NON-CONTIGUOUS BW ALLOCATION |
| | DCI FORMAT 0B | UE SPECIFIC BY C-RNTI | MULTI-ANTENNA PORT PRECODING |

FIG. 8A

| TRANSPORT BLOCK 1 | TRANSPORT BLOCK 2 | CODEWORD 0 (ENABLED) | CODEWORD 1 (DISABLED) |
|---|---|---|---|
| ENABLED | DISABLED | TRANSPORT BLOCK 1 | — |
| DISABLED | ENABLED | TRANSPORT BLOCK 2 | — |

| NUMBER OF LAYERS | NUMBER OF CODEWORDS | CODEWORD-TO-LAYER MAPPING $i = 0,1,...,M_{symb}^{layer}-1$ |
|---|---|---|
| 1 | 1 | $x^{(0)}(i) = d^{(0)}(i)$ $\quad M_{symb}^{layer} = M_{symb}^{(0)}$ |
| 2 | 2 | $x^{(0)}(i) = d^{(0)}(i)$ $\quad M_{symb}^{layer} = M_{symb}^{(0)} = M_{symb}^{(1)}$ <br> $x^{(1)}(i) = d^{(1)}(i)$ |
| 3 | 2 | $x^{(0)}(i) = d^{(0)}(i)$ <br> $x^{(1)}(i) = d^{(1)}(2i)$ $\quad M_{symb}^{layer} = M_{symb}^{(0)} = M_{symb}^{(1)}/2$ <br> $x^{(2)}(i) = d^{(1)}(2i+1)$ |
| 4 | 2 | $x^{(0)}(i) = d^{(0)}(2i)$ <br> $x^{(1)}(i) = d^{(0)}(2i+1)$ $\quad M_{symb}^{layer} = M_{symb}^{(0)}/2 = M_{symb}^{(1)}/2$ <br> $x^{(2)}(i) = d^{(1)}(2i)$ <br> $x^{(3)}(i) = d^{(1)}(2i+1)$ |

FIG. 10

| UL TRANSMISSION MODE | DCI FORMAT | SEARCH SPACE | TRANSMISSION SCHEME OF PUSCH CORRESPONDING TO PDCCH |
|---|---|---|---|
| UL MODE 1 | DCI FORMAT 0 | COMMON AND UE SPECIFIC BY C-RNTI | SINGLE-ANTENNA PORT, CONTIGUOUS BW ALLOCATION |
| | DCI FORMAT 0A | UE SPECIFIC BY C-RNTI | SINGLE-ANTENNA PORT, NON-CONTIGUOUS BW ALLOCATION |
| UL MODE 2 | DCI FORMAT 0 | COMMON AND UE SPECIFIC BY C-RNTI | SINGLE-ANTENNA PORT, CONTIGUOUS BW ALLOCATION |
| | DCI FORMAT 0B | UE SPECIFIC BY C-RNTI | MULTI-ANTENNA PORT PRECODING |

| CYCLIC SHIFT FIELD IN DCI FORMAT 0 [3] | $n_{DMRS}^{(2)}$ | INDICATED TB INDEX |
|---|---|---|
| 000 (0) | 0 | TB1 |
| 001 (1) | 6 | TB1 |
| 010 (2) | 3 | TB1 |
| 011 (3) | 4 | TB1 |
| 100 (4) | 2 | TB2 |
| 101 (5) | 8 | TB2 |
| 110 (6) | 10 | TB2 |
| 111 (7) | 9 | TB2 |

METHOD AND SYSTEM FOR INDICATING AN ENABLED TRANSPORT BLOCK

CROSS-REFERENCE TO RELATED APPLICATION(S) AND CLAIM OF PRIORITY

The present application is related to U.S. Provisional Patent Application No. 61/307,755, filed Feb. 24, 2010, entitled "UPLINK MIMO TRANSMISSION WITH MULTIPLE CODEWORDS"; U.S. Provisional Patent Application No. 61/308,222, filed Feb. 25, 2010, entitled "UPLINK MIMO TRANSMISSION WITH ONE OR TWO TRANSPORT BLOCKS"; and U.S. Provisional Patent Application No. 61/311,687, filed Mar. 8, 2010, entitled "UPLINK MIMO TRANSMISSION AND CONTROL DESIGN". Provisional Patent Application Nos. 61/307,755; 61/308,222; and 61/311,687 are assigned to the assignee of the present application and are hereby incorporated by reference into the present application as if fully set forth herein. The present application hereby claims priority under 35 U.S.C. §119(e) to U.S. Provisional Patent Application Nos. 61/307,755; 61/308,222; and 61/311,687.

TECHNICAL FIELD OF THE INVENTION

The present application relates generally to wireless communications and, more specifically, to a method and system for indicating one or more enabled transport blocks.

BACKGROUND OF THE INVENTION

In 3$^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station includes a transmit path circuitry configured to generate an uplink grant using an uplink multiple-input multiple-output (MIMO) downlink control information (DCI) format. The uplink MIMO DCI format includes a modulation and coding scheme (MSC) field having an MCS value for each of two transport blocks. The transmit path circuitry also is configured to transmit the uplink grant to a subscriber station. For a given transport block, a combination of the MCS value corresponding to the transport block and a positive integer number of physical resource blocks allocated to the subscriber station (N_PRB) indicates whether the transport block is disabled.

A method of operating a base station is provided. The method includes generating an uplink grant using an uplink multiple-input multiple-output (MIMO) downlink control information (DCI) format. The uplink MIMO DCI format includes a modulation and coding scheme (MSC) field having an MCS value for each of two transport blocks. The method also includes transmitting the uplink grant to a subscriber station. For a given transport block, a combination of the MCS value corresponding to the transport block and a positive integer number of physical resource blocks allocated to the subscriber station (N_PRB) indicates whether the transport block is disabled.

A subscriber station is provided. The subscriber station includes a receive path circuitry configured to receive an uplink grant in an uplink multiple-input multiple-output (MIMO) downlink control information (DCI) format. The uplink MIMO DCI format includes a modulation and coding scheme (MSC) field having an MCS value for each of two transport blocks. The receive path circuitry also is configured to determine whether a given transport block is disabled based at least partly upon a combination of the MCS value corresponding to the transport block and a positive integer number of physical resource blocks allocated to the subscriber station (N_PRB).

A method of operating a subscriber station is provided. The method includes receiving an uplink grant in an uplink multiple-input multiple-output (MIMO) downlink control information (DCI) format. The uplink MIMO DCI format includes a modulation and coding scheme (MSC) field having an MCS value for each of two transport blocks. The method also includes determining whether a given transport block is disabled based at least partly upon a combination of the MCS value corresponding to the transport block and a positive integer number of physical resource blocks allocated to the subscriber station (N_PRB).

A base station is provided. The base station includes a transmit path circuitry configured to generate an uplink grant using downlink control information (DCI) format 0/0A for a fallback single antenna-port transmission. The DCI format 0/0A includes two codepoints. The transmit path circuitry also is configured transmit the uplink grant to a subscriber station configured in transmission mode 2. The two codepoints indicate a first state when a first transport block is transmitted, and the two codepoints indicate a second state when a second transport block different from the first transport block is transmitted.

A method of operating a base station is provided. The method includes generating an uplink grant using downlink control information (DCI) format 0/0A for a fallback single antenna-port transmission. The DCI format 0/0A includes two codepoints. The method also includes transmitting the uplink grant to a subscriber station configured in transmission mode 2. The two codepoints indicate a first state when a first transport block is transmitted, and the two codepoints indicate a second state different from the first state when a second transport block different from the first transport block is transmitted.

A subscriber station is provided. The subscriber station includes a transmit path circuitry configured to operate in transmission mode 2, and receive an uplink grant using downlink control information (DCI) format 0/0A for a fallback single antenna-port transmission. The DCI format 0/0A includes two codepoints. The transmit path circuitry also is configured determine a first transport block is transmitted when the two codepoints indicate a first state, and determine a second transport block different from the first transport block is transmitted when the two codepoints indicate a second state different from the first state.

A method of operating a subscriber station is provided. The method includes operating in transmission mode 2 and receiving an uplink grant using downlink control information (DCI) format 0/0A for a fallback single antenna-port transmission. The DCI format 0/0A includes two codepoints. The method also includes determining a first transport block is transmitted when the two codepoints indicate a first state, and determining a second transport block different from the first transport block is transmitted when the two codepoints indicate a second state different from the first state.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE terms "node B", "enhanced node B", and "eNodeB" are other terms for "base station" used below. Also, the LTE term "user equipment" or "UE" is another term for "subscriber station" used below.

Figure 1:
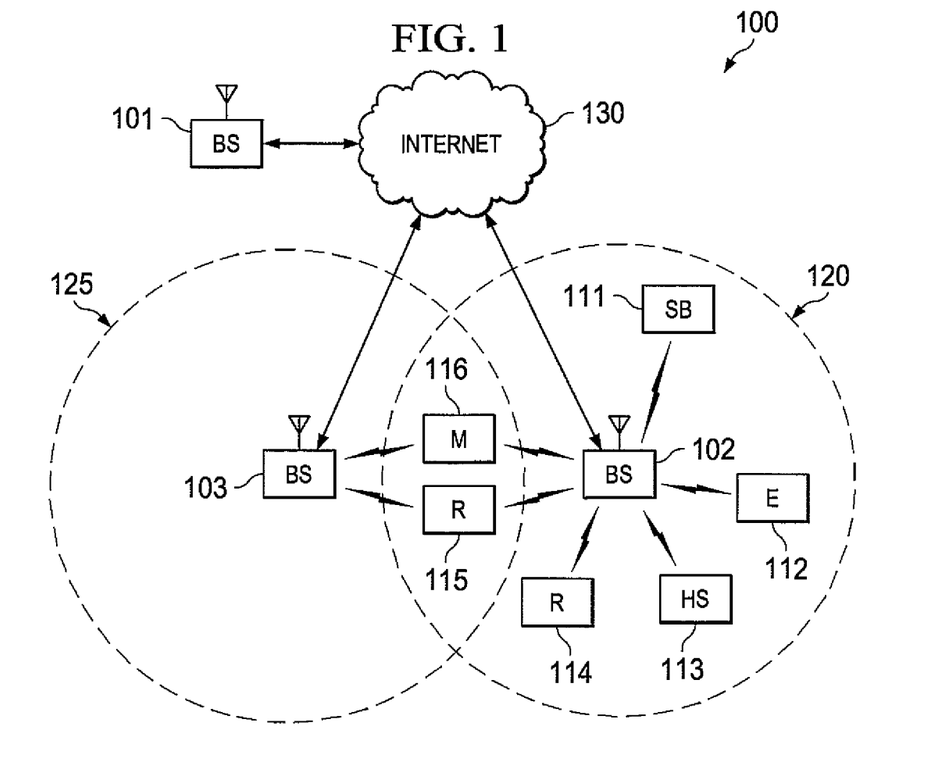
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
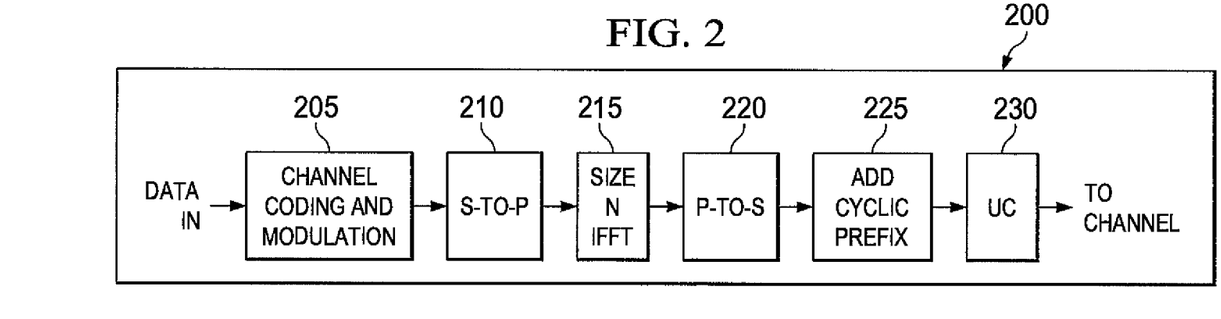
FIG. 2 is a high-level diagram of an orthogonal frequency division multiple access (OFDMA) transmitter according to one embodiment of this disclosure.
Figure 3:
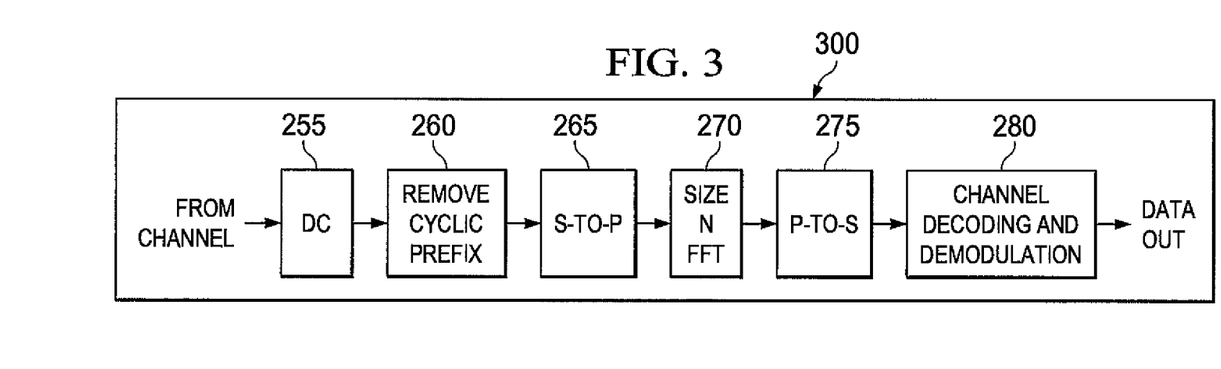
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where k=0, ..., $N_{RB}^{DL}N_{sc}^{RB}-1$ and l=0, ..., $N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS:DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
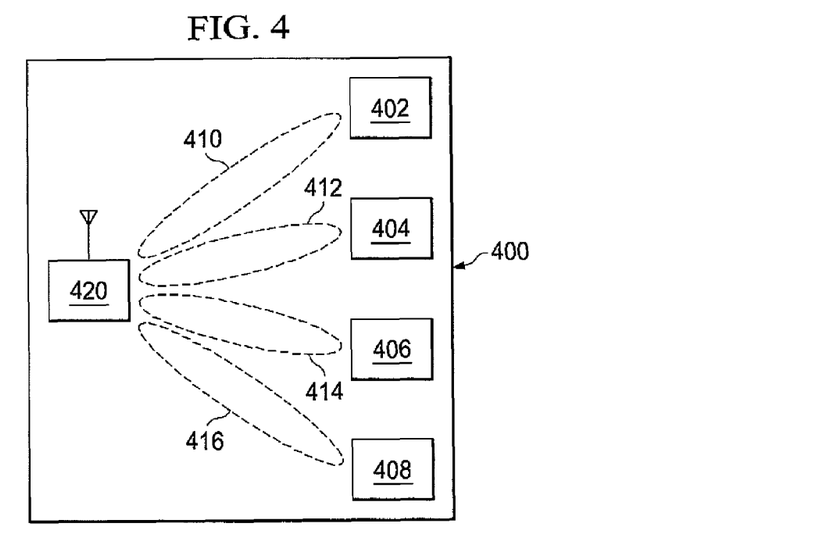
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
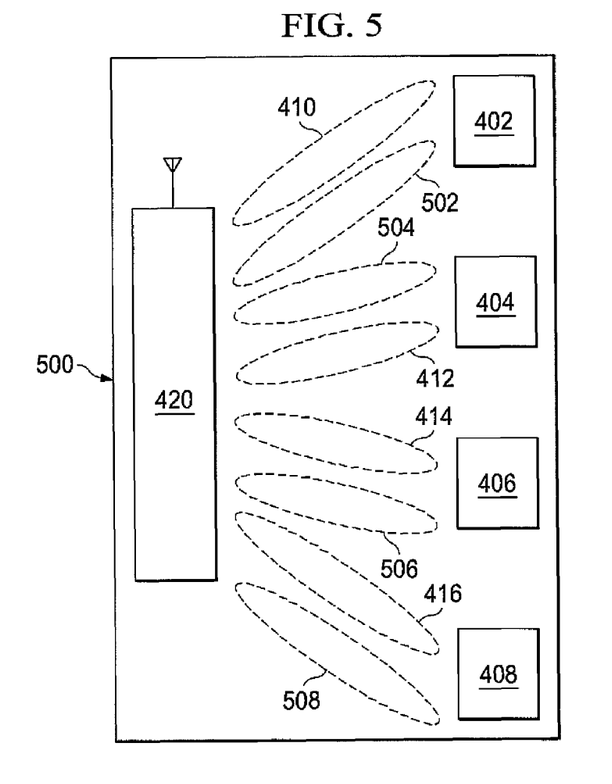
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

Figure 6:
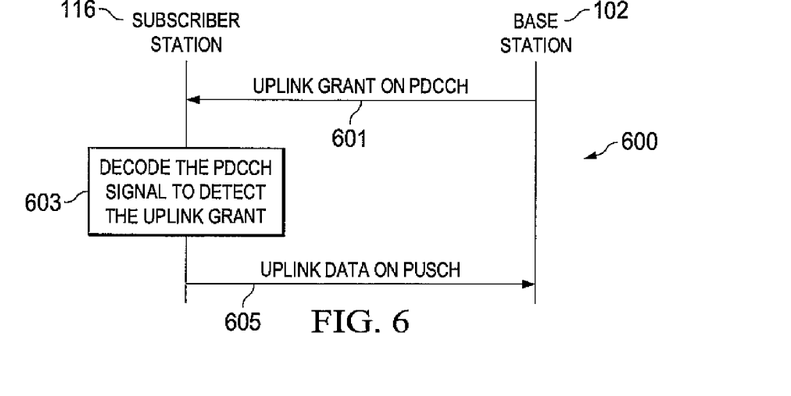
FIG. 6 illustrates an uplink transmission procedure according to an embodiment of this disclosure.

FIG. 6 illustrates an uplink transmission procedure 600 according to an embodiment of this disclosure.

As shown in FIG. 6, the base station 103 has new data to be transmitted to the mobile station 116. In order to transmit the data, an uplink grant is transmitted from the base station 102 to the mobile station 116 on the physical downlink control channel (PDCCH) at flow 601. At block 603, the mobile station 116 decodes the PDCCH signal to detect the uplink grant, which includes a new data indicator to indicate new data. Upon detecting the uplink grant, the uplink (new) data is transmitted from the mobile station 116 to the base station 103 on the physical uplink shared channel (PUSCH) at flow 605.

Although the PDCCH serves a variety of purposes, the PDCCH is used primarily to convey the scheduling decisions to individual UEs, i.e. scheduling assignments for uplink and downlink. The information carried on PDCCH is referred to as downlink control information (DCI).

Different formats of DCI are used depending upon the purposes of the control message. For example, DCI format 0 is used on the PDCCH to convey the uplink scheduling grant. DCI format 0 includes a 5-bit modulation and coding scheme and redundancy version (MCS/RV) field.

For the PUSCH channel, the mapping of the MCS/RV field to the transport block size (TBS) and the modulation format as well as redundancy version (RV) is given by Table 8.6.1-1 in 3GPP TS 36.213 v9.0.0, "E-UTRA, Physical Layer Procedures", December 2009, which is hereby incorporated by reference into the present application as if fully set forth herein. The UE uses the MSC index ($I_{MCS}$) and Table 8.6.1-1 to determine the redundancy version ($rv_{idx}$) to use in the physical uplink shared channel.

In 3GPP TS 36.212 v 9.0.0, "E-UTRA, Multiplexing and Channel coding", December 2009, which is hereby incorporated by reference into the present application as if fully set forth herein, for DL MIMO of LTE, the relationship between the active transport block (TB) and the codewords is established as follows:

if both transport blocks are enabled, the transport block to codeword mapping is specified according to Table 5.3.3.1.5-1.

if one transport blocks is disabled as specified in section 7.1.7.2 of 3GPP TS 36.213 v9.0.0, "E-UTRA, Physical Layer Procedures", December 2009, the transport block to codeword swap flag is reserved, and the transport block to codeword mapping is specified according to Table 5.3.3.1.5-2.

To indicate the disabling of a given TB, section 7.1.7.2 of 3GPP TS 36.213 v9.0.0, "E-UTRA, Physical Layer Procedures", December 2009, which is hereby incorporated by reference into the present application as if fully set forth herein, provides that the combination of MCS=0 and RV=1 is used to indicate the disabling of a given TB.

In DCI formats 2, 2A and 2B, a transport block is disabled if $I_{MCA}=0$ and $rv_{idx}=1$. Otherwise, the transport block is enabled.

UL MIMO is one of the main features of Rel-10 LTE-Advanced standard.

Figure 7:
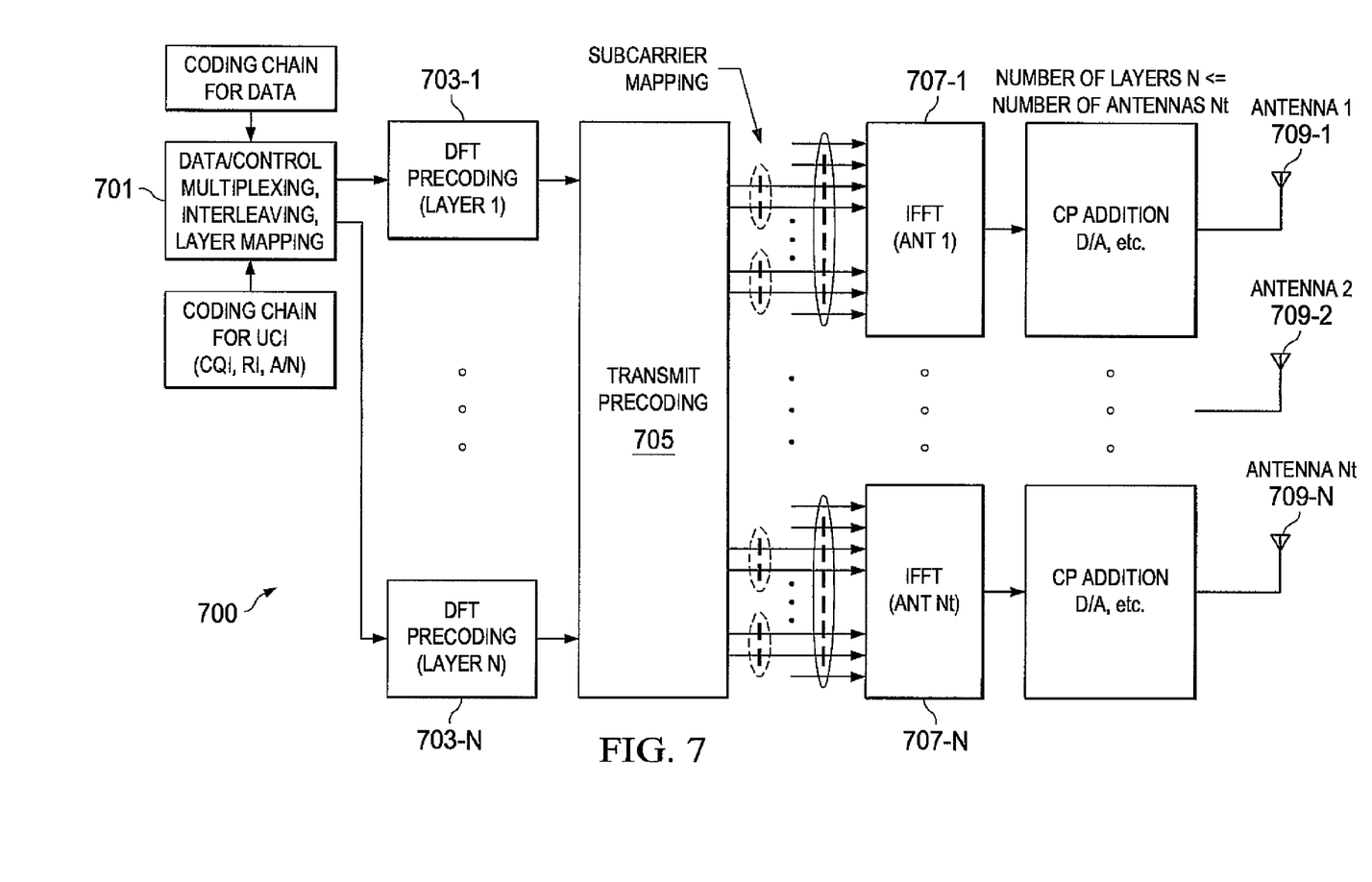
FIG. 7 illustrates a transmit processing chain for an uplink MIMO transmission according to an embodiment of this disclosure.

FIG. 7 illustrates a transmit processing chain 700 for a UL MIMO transmission according to an embodiment of this disclosure.

As shown in FIG. 7, transmit processing chain 700 includes a multiplexing/interleaving/mapping unit 701. Multiplexing/interleaving/mapping unit 701 receives a coding chain for data and a coding chain for uplink control information. Multiplexing/interleaving/mapping unit 701 then multiplexes, interleaves and maps the data, and outputs the data to corresponding DFT precoding units 703-1 to 703-N. The output of DFT precoding units 703-1 to 703-N is received at a transmit precoding unit 705. The transmit precoding unit 705 outputs the precoded data to corresponding IFFT units 707-1 to 707-N. IFFT units 707-1 to 707-N output the transformed data to corresponding antennas 709-1 to 709-N.

Figure 8A:
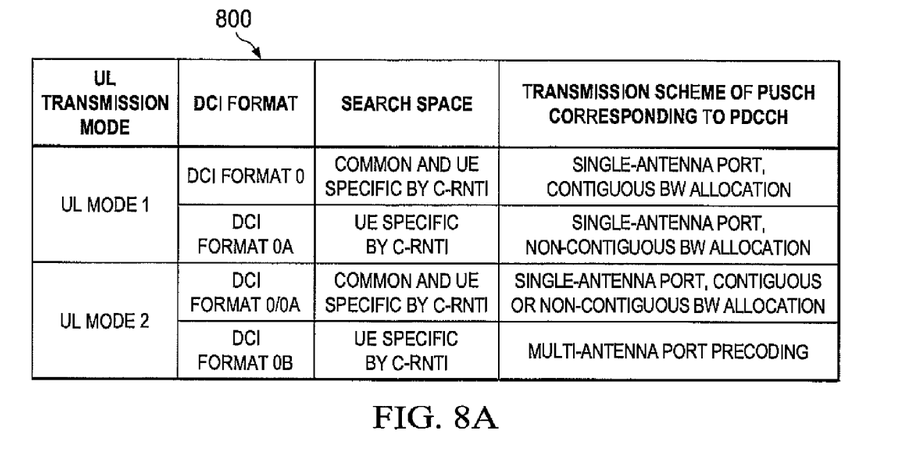
FIG. 8A illustrates a table 800 showing a correlation between uplink transmission modes, DCI formats, search spaces, and transmission schemes of PUSCH corresponding to PDCCH according to an embodiment of this disclosure.

FIG. 8A illustrates a table 800 showing a correlation between uplink transmission modes, DCI formats, search spaces, and transmission schemes of PUSCH corresponding to PDCCH according to an embodiment of this disclosure.

Up to three transmission modes can be used to configure an UL MIMO mode.

As shown in table 800, UL transmission mode 1 uses DCI Format 0 and DCI Format 0A. This is the single antenna port mode for contiguous and non-contiguous bandwidth (BW) allocation where the UE monitors DCI Format 0 or DCI Format 0A. The size of DCI Format 0A can be the same as the size of DCI Format 0.

UL transmission mode 2 uses DCI Formats 0/0A and DCI Format 0B. This is the general UL SU/MU MIMO mode that can support to up to 2 CWs in one sub-frame. The fall-back mode is supported by DCI Formats 0/0A.

UL transmission mode 3 uses DCI Formats 0/0A and DCI Format 0C. This is the UL MIMO mode that supports only 1 CW in one sub-frame, similar to the rank-1 precoding mode in the Rel-8 DL. The fall-back mode is supported by DCI Formats 0/0A.

Among the 3 potential PUSCH modes discussed above, modes 1 and 2 form the baseline set to ensure proper operation of Rel-10. UL mode 1 can also support rank-1 multi-antenna transmission with the UE autonomously performing "virtualization" of all physical antennas into a single antenna port. Meanwhile, UL Mode 2 (and DCI format 0B) can be used for rank-1 transmission with a slightly higher overhead compared to UL Mode 3.

Similar to Rel-8 DL, a fall-back transmission scheme is needed for each Rel-10 UL transmission mode. As discussed in 3GPP TS 36.212 v 9.0.0, "E-UTRA, Multiplexing and Channel coding", December 2009, which is hereby incorporated by reference into the present application as if fully set forth herein, the non-contiguous resource allocation (RA) for DCI Format 0A can be such that the size of DCI Format 0 is the same as the size of DCI Format 0A. Therefore, the fall-back mode can be supported with both BW-contiguous and BW-non-contiguous transmission schemes.

Table 800 summarizes PUSCH transmission modes using C-RNTI as an example. In table 800, it is assumed that DCI Formats 0 and 0A are the same size.

The DL MIMO approach of using $I_{MCS}=0$ and $rv_{idx}=1$ to determine if a TB is disabled cannot be used for an UL MIMO transmission because the RV index is not explicitly included in the UL DCI formats.

Figure 8B:
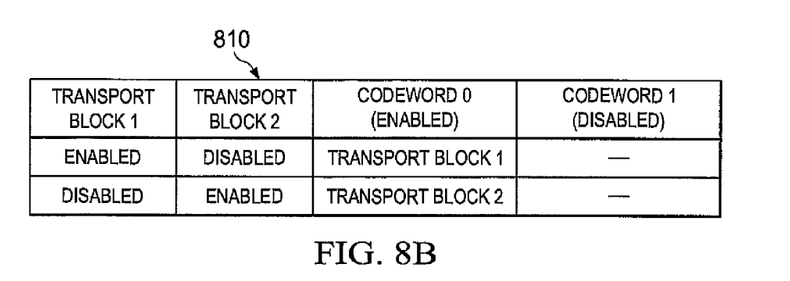
FIG. 8B illustrates a table 810 used to map a transport block to a codeword according to an embodiment of this disclosure.

FIG. 8B illustrates a table 810 used to map a transport block to a codeword according to an embodiment of this disclosure.

In an embodiment of this disclosure, the UL MIMO DCI format does not have a TB to CW swap bit. In such an embodiment, table 810 would be used to map a transport block to a codeword. For example, if both TBs are enabled, then transport block 1 is mapped to codeword 0, and transport block 2 is mapped to codeword 2. As shown in table 810, if transport block 1 is disabled, then codeword 0 is mapped to transport block 2. If transport block 2 is disabled, then codeword 0 is mapped to transport block 1.

In this disclosure, it is assumed that there are two 5-bit MCS-RV fields in the uplink MIMO DCI format 0B, each indicating the MCS and RV choice for a given TB. For ease of description, it also is assumed that MCS1 is the MCS field associated with TB1, and MCS2 is the MCS field associated with TB2.

In an embodiment of this disclosure, a new 2-bit information element (IE), called TB_enable, is added to the UL MIMO DCI format 0B to indicate the following four states (using the four codepoints 00,01,10 and 11 from the TB_enable IE):

both TB1 and TB2 are enabled;
TB1 is enabled and TB2 is disabled;
TB2 is enabled and TB1 is disabled; and
Reserved.

In an embodiment of this disclosure, one of the MCS index values is reserved to indicate that a TB is disabled.

For example, the MCS value of 0 is used to indicate a TB is disabled. The benefit of this choice is that the MCS=0 indicates a very small TBS size. Accordingly, omitting such as small size may not be a major issue for system operation. For example, for a given TB, $I_{MCS}=0$ indicates that the TB is disabled;
otherwise, the TB is enabled.

In another example, one of the MCS values belonging to the set {10,11,20,21} can be used to indicate that a TB is disabled. The benefit of such a choice is that the pair of MCS values {10,11} indicates the same TBS size but with different modulation format (QPSK and 16QAM for example), while the pair of MCS values {20,21} indicate the same TBS size but with different modulation format (16QAM and 64QAM for example). Therefore, TBS size is not sacrificed if an MCS value from the set {10,11,20,21} is chosen to indicate that a certain TB is disabled. For example, MCS value of 10 can be used to indicate that a certain TB is disabled. For example, for a given TB, $I_{MCS}=10$ indicates that the TB is disabled;
otherwise, the TB is enabled.

In another example, one of the MCS values belonging to the set {29,30,31} is used to indicate that a particular transport block is disabled. Since MCS={29,30,31} corresponds to the retransmission of a packet with RV values of {1,2,3}, reserving a value from {29,30,31} means one of the RV values will not be available for retransmission, which is not a major problem from system operation viewpoint. For example, the MCS value of 31 can be used to indicate that a particular TB is disabled. For example, for a given TB, $I_{MCS}$=31 indicates that the TB is disabled;

otherwise, the TB is enabled.

In an embodiment of this disclosure, the combination of an MCS index value belonging to the set {29,30,31} and NDI=1 (meaning the NDI bit for this TB is toggled) for a given TB is used to indicate that the TB is disabled. With this approach, NDI=1 (toggle) indicates that this is a new transmission and is typically not accompanied by a MCS value of 29, 30 or 31 because an MCS value of 29,30,31 indicates retransmission. Therefore, the combination of these two events can be used to indicate that a TB is disabled. In this embodiment, it is assumed that there is one NDI bit for each TB, and there will be a total of 2 NDI bits for the UL SU-MIMO DCI format.

For example, the combination of MCS=31 and NDI can be used for this purpose. Of course, the value 31 can be replaced with either 29 or 30. For example, for a given TB, $I_{MSC}$=31 and NDI=1 indicates that this TB is disabled;

otherwise, the TB is enabled.

In an embodiment of this disclosure, for a given TB, a combination of the MCS field and the number of physical resource blocks (indicated by N_PRB) is used to indicate that the TB is disabled. The TB disabling is caused by the codepoint in the UL MIMO DCI format 0B that is a function of MCS value and the N_PRB of that TB. In particular embodiments, the N_PRB can be obtained from the RA (resource allocation) field in the DCI format.

There are many ways of constructing codepoint examples that are functions of the MCS value and the N_RPB. A Threshold for determining whether a TB is disabled could be a fixed value, e.g. half the bandwidth, or could be semi-statically configured by the higher layer.

For example, for a given TB, if N_PRB>=Threshold, then a small MCS value such as MCS=0 is used to indicate disabling of the TB; and if N_PRB<Threshold, then a large MCS value (but not one of the values 29,30,31 that indicates retransmission), such as MCS=28, is used to indicate disabling of the TB. In a particular embodiment, assume that the Threshold is a value of 2. In that case, if N_PRB>=2, then a small MCS value such as MCS=0 is used to indicate disabling of the TB. If N_PRB<2, then a large MCS value, such as MCS=28, is used to indicate disabling of the TB.

Of course, an equivalent way of expressing the relationship between N_PRB and the Threshold is if N_PRB>Threshold, then a small MCS value such as MCS=0 is used to indicate disabling of the TB; and if N_PRB<=Threshold, then a large MCS value (but not one of the values 29,30,31 that indicates retransmission), such as MCS=28, is used to indicate disabling of the TB. If the relationship is expressed in this manner, setting the Threshold to 1 would be the same setting the Threshold to 2 in the previous expression.

Otherwise, the TB is enabled.

In another example, the MCS value toggles between the pair {10,11} or {20,21} as the value of N_PRB changes. The pair {10,11} is used as an example here.

If N_PRB>=Threshold, then an MCS value, such as MCS=10 (or 11), is used to indicate that the TB is disabled. If N_PRB<Threshold, then an MCS value of MCS=11 (or 10) is used to indicate that the TB is disabled.

Otherwise, the TB is enabled.

Similarly, with the pair {20,21}:

if N_PRB>=Threshold, then an MCS value such as MCS=20 (or 21) is used to indicate that the TB is disabled. If N_PRB<Threshold, then an MCS value of MCS=21 (or 20) is used to indicate that the TB is disabled;

otherwise, the TB is enabled.

Figure 9:
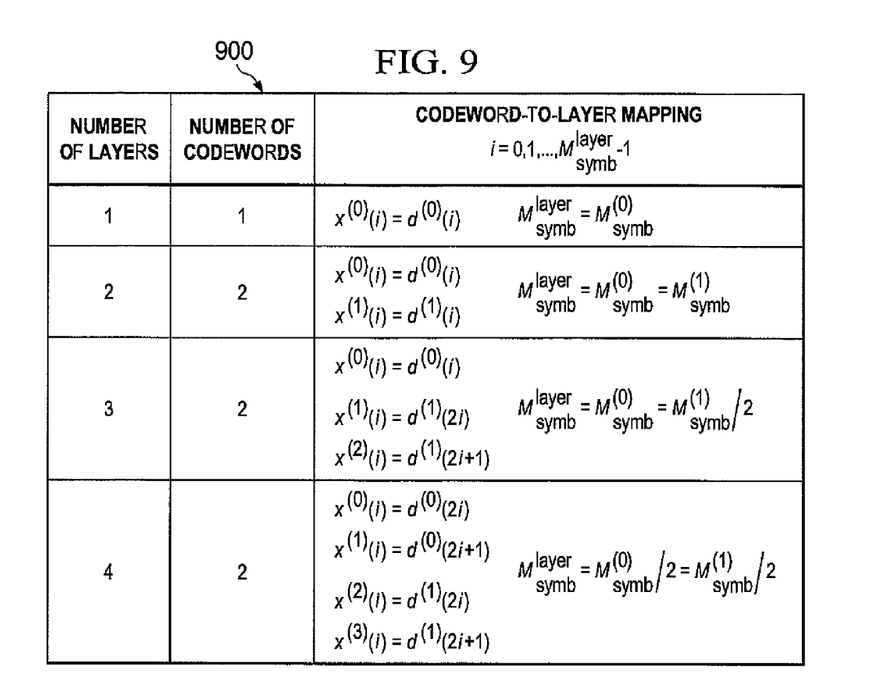
FIG. 9 illustrates a table used to remove the mapping of two layers to a single codeword according to an embodiment of this disclosure.

FIG. 9 illustrates a table 900 used to remove the mapping of two layers to a single codeword according to an embodiment of this disclosure.

In an embodiment of this disclosure, a given TB is disabled as follows:

1. remove the case of mapping two layers to a single codeword using table 900. Although table 900 is more natural for the case in which the 2 NDI bits of the 2 TBs are bundled into 1 NDI bit in the UL MIMO DCI format, table 900 also is applicable when the NDI bits are not bundled.

2. using the new table, the UE knows without ambiguity from the PMI/RI field that:

if the number of layers=1 (rank=1), then one TB is enabled and one TB is disabled, and if the number of layers>1 (rank>1), then both TBs are enabled; and 3. use two states to indicate which TB is disabled when the number of layers=1 (rank=1):

the two states can be created by adding a 1-bit information field (namely d) to the UL MIMO DCI format. For example, d=0 indicates that TB1 is disabled and d=1 indicates that TB2 is disabled; and in another example, the two TBs are indicated by linking the two TBs to the values in the 3-bit cyclic shift field (CSI values). In a particular, among the 8 CSI values, the first 4 indicates that TB1 is disabled, and the next 4 indicates that TB2 is disabled. For example, among the 8 CSI values {0, 1, . . . 7}, the first 4:{0,1,2,3} indicates that TB1 is disable, and the next 4:{4,5,6,7} indicates that TB2 is disabled; and in another example, the disabled TB is indicated using a reserved MCS value, and this reserved value is from 0 to 31. That is if, for a given TB, the MCS value equals the reserved value (e.g., 0), then the TB is disabled.

In an embodiment of this disclosure, a new 1-bit IE is added to the UL MIMO DCI format to indicate whether or not there is one or two enabled TBs for the UL transmission. If this 1-bit IE is denoted as N_TB, then one possibility is to have:

N_TB=0 (or 1) indicates that one TB is enabled, and one TB is disabled; and

N_TB=1 (or 0) indicates that two TBs are enabled.

In addition, an MCS value is reserved for each TB to indicate whether the TB is disabled. The reserved MCS can take a value between 0 and 31. In summary, the UE monitors the N_TB bit and the two MCS fields to determine whether or not one of the TBs is disabled, and if so, which TB is disabled. For example, if the reserved MCS is $I_{MCS}$=0, then the overall solution is as follows:

N_TB=0 (or 1) indicates that one TB1 is enabled, and one TB1 is disabled;

if $I_{MCS}$=0 for the MCS/RV field of TB1, then TB1 is disabled, and if $I_{MCS}$=0 for the MCS/RV field of TB2, then TB2 is disabled; and N_TB=1 (or 0) indicates two TBs are enabled.

Of course, an MCS value of 0 is used strictly as an example. One of ordinary skill in the art would recognize that an MCS value of 1 also could be used.

In an embodiment of this disclosure, a new 1-bit IE is added to the UL MIMO DCI format to indicate whether or not there is one or two enabled TBs for the UL transmission. If this 1-bit IE is denoted as N_TB, then one possibility is to have:
  N_TB=0 (or 1) indicates one TB is enabled, and one TB disabled; and
  N_TB=1 (or 0) indicates two TBs are enabled.

If an MCS value is reserved for each TB to indicate the disabling of the TB, the reserved MCS can take a value between 0 and 31. In addition, if N_TB indicates that one of the TBs is disabled and the MCS of both TBs is identical to the reserved MCS, then TB1 (or TB2) is enabled and TB2 (or TB1) is disabled, i.e. TB1 (or TB2) will follow the MCS level corresponding to TB1 (or TB2) even though the MCS level is reserved for the indication of a disabled TB. In summary, the UE monitors the N_TB bit and the two MCS fields to determine whether or not one of the TBs is disabled, and if so, which TB is disabled. For example, if the reserved MCS is $I_{MCS}=0$, then the overall solution is as follows:
  N_TB=0 (or 1) indicates one TB is enabled, and one TB is disabled;
    if $I_{MCS}=0$ for the MCS/RV field of TB1, then TB1 is disabled,
    if $I_{MCS}=0$ for the MCS/RV field of TB2, then TB2 is disabled, and
    $I_{MCS}=0$ for the MCS/RV fields of both TB1 and TB2, then TB1 (or TB2) is enabled and TB2 (or TB1) is disabled; and
  =N_TB=1 (or 0) indicates two TBs are enabled.

Of course, an MCS value of 0 is used strictly as an example. One of ordinary skill in the art would recognize that an MCS value of 1 also could be used.

In an embodiment of this disclosure, the set of the 8 values indicated by the 3-bit CSI field in the UL MIMO DCI format, {0,1,2,3,4,5,6,7}, is divided into three subsets S1, S2 and S3. One example of the subsets is S1={0,1,2,3,4,5}, S2={6}, and S3={7}. Another example of the subsets is S1={0,1,2,3}, S2={4,5}, and S3={6,7}.

The subset information is used to indicate which TB is enabled as follows:
  if the CSI value belongs to S1, then the UE assumes that two TBs are enabled;
  if the CSI value belongs to S2, then the UE assumes TB1 is enabled and TB2 is disabled; and
  if CSI value belongs to S3, then the UE assumes TB1 is disabled and TB2 is enabled.

In an embodiment of this disclosure, the set of the 8 values indicated by the 3-bit CSI field in the UL MIMO DCI format, {0,1,2,3,4,5,6,7}, is divided into two subsets S1, S2. One example of the subsets is S1={0,1,2,3,4,5,6} and S2={7}. Another example of the subsets is S1={0,1,2,3} and S2={4,5,6,7}.

In addition, a combination of the subset information and the MCS value of a given TB is used to indicate whether a given TB is enabled or disabled. In such an embodiment, when a UE receives the UL DCI format, the UE will:
  assume that two TBs are enabled if the CSI value belongs to S1; and
  proceed to check the MCS/RV values of each TB if the CSI value belongs to S2. An MCS value is reserved for each TB to indicate whether the TB is disabled. The reserved MCS can take a value between 0 and 31. For example, if the reserved MCS is $I_{MCS}=0$, then the overall solution is summarized as follows:
    if $I_{MCS}=0$ for the MCS/RV field of TB1, then TB1 is disabled;
    if $I_{MCS}=0$ for the MCS/RV field of TB2, then TB2 is disabled; and
    otherwise, both TBs are enabled.

Of course, an MCS value of 0 is used strictly as an example. One of ordinary skill in the art would recognize that an MCS value of 1 also could be used.

In an embodiment of this disclosure, the set of the 8 values indicated by the 3-bit CSI field in the UL MIMO DCI format, {0,1,2,3,4,5,6,7}, is divided into two subsets S1, S2. One example of the subsets is S1={0,1,2,3,4,5,6} and S2={7}. Another example of the subsets is S1={0,1,2,3} and S2={4,5,6,7}.

In addition, a combination of the subset information and the MCS value of a given TB is used to indicate whether a given TB is enabled or disabled. When a UE receives the UL DCI format, the UE will
  assume that two TBs are enabled if the CSI value belongs to S1; and
  proceed to check the MCS/RV values of each TB if the CSI value belongs to S2. An MCS value is reserved for each TB to indicate the disabling of the TB. The reserved MCS can take a value between 0 and 31. In addition, if N_TB indicates that one of the TBs is disabled and the MCS of both TBs is identical to the reserved MCS, then TB1 (or TB2) is enabled and TB2 (or TB1) is disabled, i.e. TB1 (or TB2) will follow the MCS level corresponding to TB1 (or TB2) even though the MCS level is reserved for indicating the disabled TB. In summary, the UE monitors the N_TB bit and the two MCS fields to determine whether or not one of the TBs is disabled, and if so, which TB is disabled. For example, if the reserved MCS is $I_{MCS}=0$, then the overall solution is summarized as follows:
    if $I_{MCS}=0$ for the MCS/RV field of TB1, then TB1 is disabled;
    if $I_{MCS}=0$ for the MCS/RV field of TB2, then TB2 is disabled;
    if $I_{MCS}=0$ for the MCS/RV fields of both TB1 and TB2, then TB1 (or TB2) is enabled and TB2 (or TB1) is disabled; and
    otherwise, both TBs are enabled.

Figure 10:
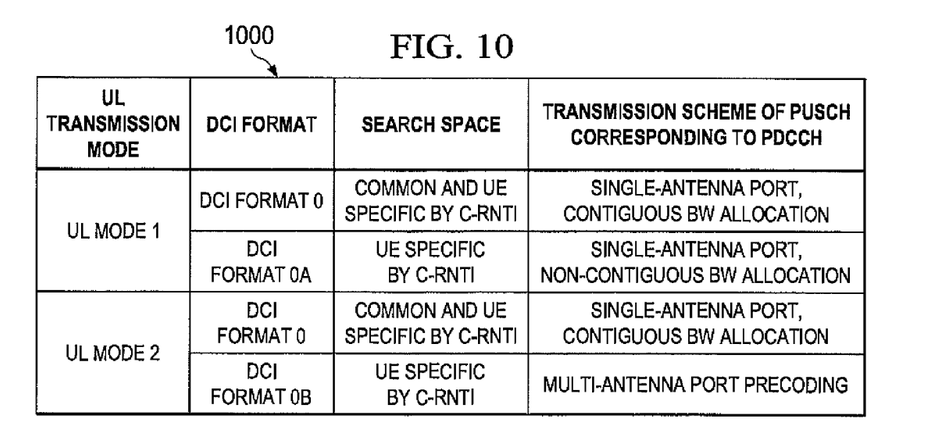
FIG. 10 illustrates a transmission mode table according to an embodiment of this disclosure.

FIG. 10 illustrates a transmission mode table 1000 according to an embodiment of this disclosure.

Transmission mode table 1000 allows the fallback from MIMO DCI format 0B to only contiguous single-antenna port with DCI format 0.

In an embodiment of this disclosure, when a UE is configured in UL transmission mode 2 and receives a DCI format 0 or 0A assignment, the UE assumes that the PUSCH transmission is associated with transport block 1 and that transport block 2 is disabled.

Figure 11:
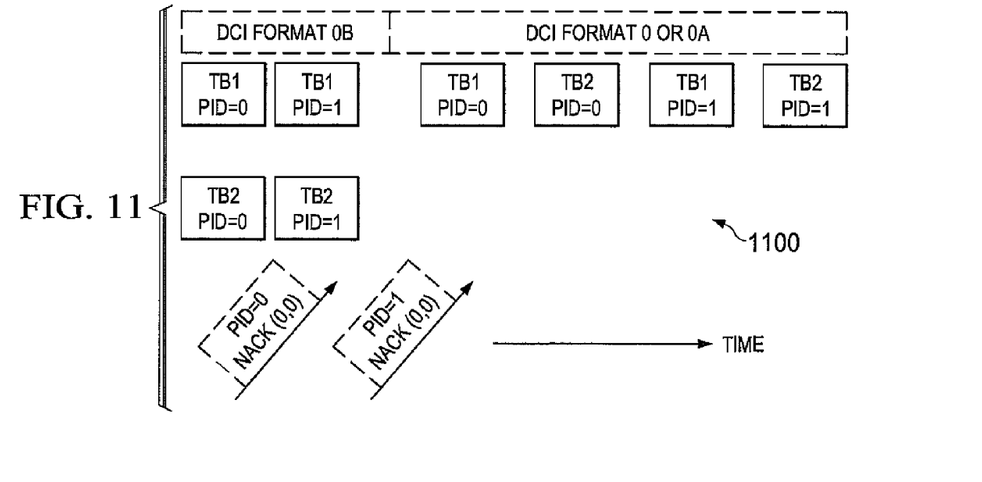
FIG. 11 illustrates a transition from MIMO DCI format 0B to non-MIMO format 0 or 0A according to an embodiment of this disclosure.

FIG. 11 illustrates a transition 1100 from MIMO DCI format 0B to non-MIMO format 0 or 0A according to an embodiment of this disclosure.

In an embodiment of this disclosure, when a UE is configured in UL transmission mode 2 and receives a DCI format 0 or 0A assignment, the UE assumes that the PUSCH transmission is associated with either transport block 1 or transport block 2. The DCI format 0 or 0A will include 2 codepoints to indicate the following two states:
  State1: TB1 is transmitted; and
  State2: TB2 is transmitted.

The transition from the MIMO DCI format 0B to non-MIMO format 0 or 0A is illustrated in FIG. 11. Similarly, the transition from non-MIMO DCI format 0/0A to MIMO DCI format 0B is possible. In this embodiment, PID denotes HARQ Process ID, which is implicitly linked to the subframe number.

In an embodiment of this disclosure, while a UE is configured in the UL MIMO transmission mode, the following approaches are used to indicate whether transport block 1 or transport block 2 is transmitted when DCI format 0 is received.

The first approach is to make use of the zero padding bit in format 0, which is used in DCI format 0 to make sure the size of the DCI format 0 is the same as the DCI format 1A. That is:

if the padding bit is 0, then TB1 (or TB2) is transmitted; and
if the padding bit is 1, then TB2 (or TB1) is transmitted.

In an embodiment of this disclosure, the frequency hopping bit in the UL DCI format 0 is reinterpreted. That is if a UE is configured in UL MIMO mode and receives DCI format 0:

if the frequency hopping bit is 0, then TB1 (or TB2) is transmitted; and
if the frequency hopping bit is 1, then TB2 (or TB1) is transmitted.

In addition, when the hopping bit is used to indicate the TB index, then the UE assumes either of the alternatives:

frequency hopping is always off, or
frequency hopping is always on
if the UE receives DCI format 0 while configured in the UL MIMO mode.

In an embodiment of this disclosure, the set of the 8 values indicated by the 3-bit CSI field in the UL MIMO DCI format, {0,1,2,3,4,5,6,7}, is divided into two subsets S1, S2. One example of the subsets is S1={0,1,2,3,4,5,6} and S2={7}. Another example of the subsets is S1={0,1,2,3} and S2={4,5,6,7}.

In addition, the CSI subset information is used to indicate whether TB1 or TB2 is transmitted in the UL packet indicated by a DCI format 0. For example, if the CSI value belongs to S1, then the UE transmit information associated with TB1; and
if the CSI value belongs to S2, then the UE transmits information associated with TB2.

Figure 12:
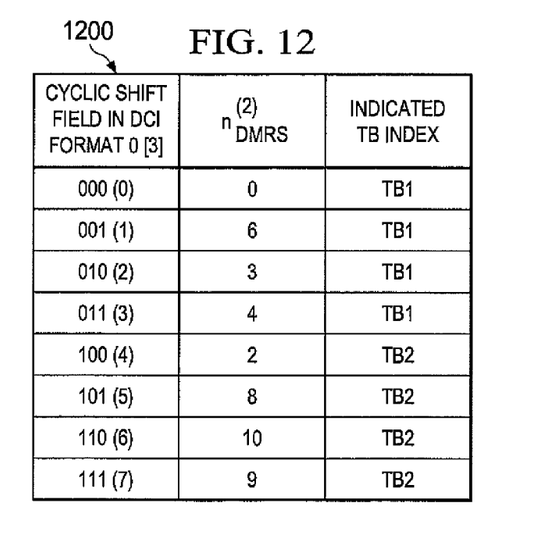
FIG. 12 illustrates a table mapping a value in a cyclic shift field of a DCI format 0 to a cyclic shift value and a TB index according to an embodiment of this disclosure.

FIG. 12 illustrates a table 1200 mapping a value in a cyclic shift field of a DCI format 0 to a cyclic shift value and a TB index according to an embodiment of this disclosure.

Table 1200 illustrates the use of the CSI in DCI format 0 to indicate a combination of the $n_{DMRS}^{(2)}$ (CS cyclic shift value) and the TB index. In this embodiment, it is assumed that the subsets are constructed in a way such S1={0,1,2,3} and S2={4,5,6,7}.

Of course, one of ordinary skill in the art would recognize that other ways of grouping the CSI values into two subsets also are possible.

Figure 13:
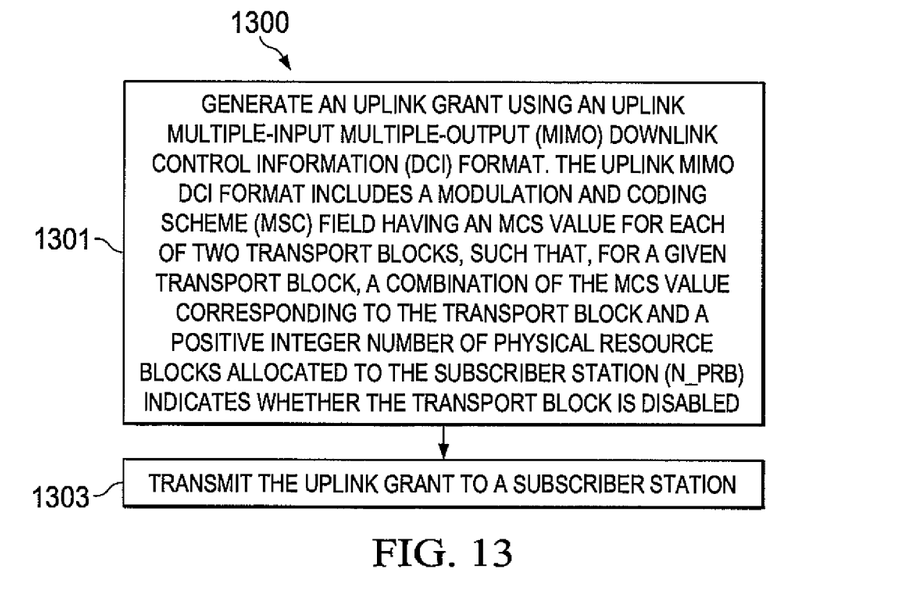
FIG. 13 illustrates a method of operating a base station according to an embodiment of this disclosure.

FIG. 13 illustrates a method 1300 of operating a base station according to an embodiment of this disclosure.

As shown in FIG. 13, method 1300 includes generating an uplink grant using an uplink multiple-input multiple-output (MIMO) downlink control information (DCI) format (block 1301). The uplink MIMO DCI format includes a modulation and coding scheme (MSC) field having an MCS value for each of two transport blocks, such that, for a given transport block, a combination of the MCS value corresponding to the transport block and a positive integer number of physical resource blocks allocated to the subscriber station (N_PRB) indicates whether the transport block is disabled. Method 1300 also includes transmitting the uplink grant to a subscriber station (block 1303).

Figure 14:
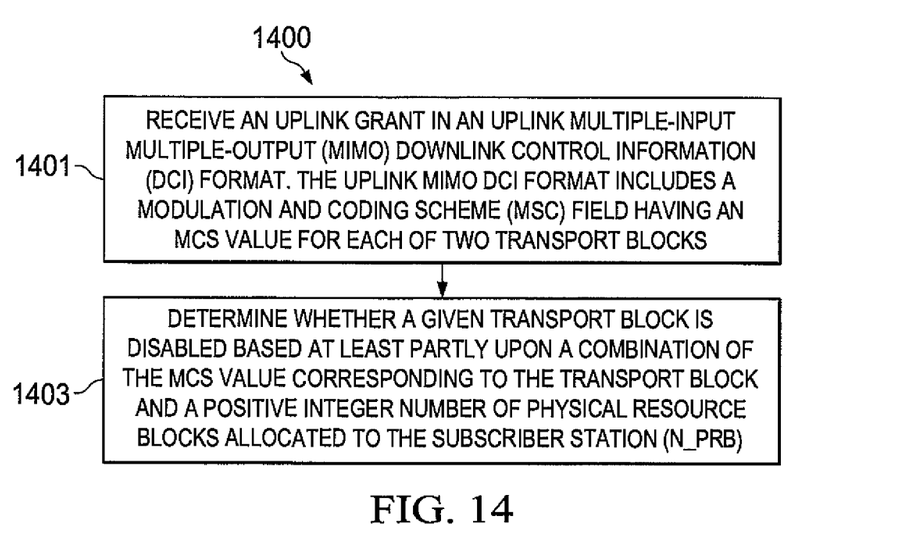
FIG. 14 illustrates a method of operating a subscriber station according to an embodiment of this disclosure.

FIG. 14 illustrates a method 1400 of operating a subscriber station according to an embodiment of this disclosure.

As shown in FIG. 14, method 1400 includes receiving an uplink grant in an uplink multiple-input multiple-output (MIMO) downlink control information (DCI) format (block 1401). The uplink MIMO DCI format includes a modulation and coding scheme (MSC) field having an MCS value for each of two transport blocks. Method 1400 also includes determining whether a given transport block is disabled based at least partly upon a combination of the MCS value corresponding to the transport block and a positive integer number of physical resource blocks allocated to the subscriber station (N_PRB) (block 1403).

Figure 15:
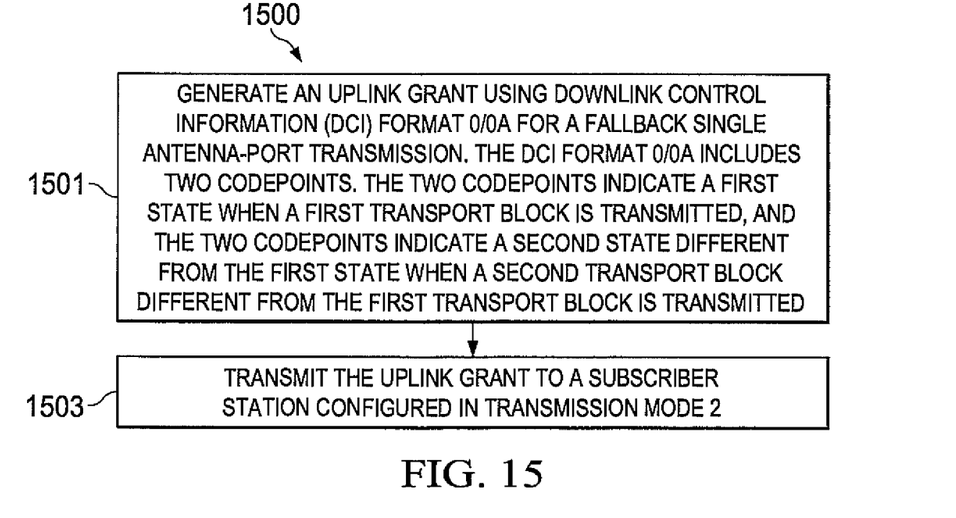
FIG. 15 illustrates a method of operating a base station according to another embodiment of this disclosure.

FIG. 15 illustrates a method 1500 of operating a base station according to another embodiment of this disclosure.

As shown in FIG. 15, method 1500 generating an uplink grant using downlink control information (DCI) format 0/0A for a fallback single antenna-port transmission (block 1501). The DCI format 0/0A includes two codepoints. The two codepoints indicate a first state when a first transport block is transmitted, and the two codepoints indicate a second state different from the first state when a second transport block different from the first transport block is transmitted. Method 1500 also includes transmitting the uplink grant to a subscriber station configured in transmission mode 2 (block 1503).

Figure 16:
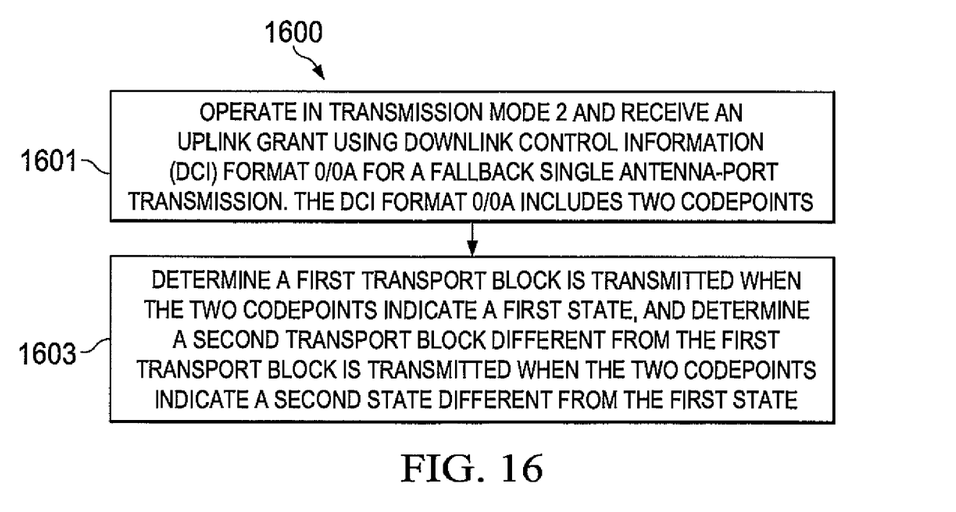
FIG. 16 illustrates a method of operating a subscriber station according to another embodiment of this disclosure.

FIG. 16 illustrates a method 1600 of operating a subscriber station according to another embodiment of this disclosure.

As shown in FIG. 16, method 1600 includes operating in transmission mode 2 and receiving an uplink grant using downlink control information (DCI) format 0/0A for a fallback single antenna-port transmission (block 1601). The DCI format 0/0A includes two codepoints. Method 1600 also includes determining a first transport block is transmitted when the two codepoints indicate a first state, and determining a second transport block different from the first transport block is transmitted when the two codepoints indicate a second state different from the first state (block 1603).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
a controller configured to:
generate an uplink grant using an uplink multiple-input multiple-output (MIMO) downlink control information (DCI) format, the uplink MIMO DCI format comprising a modulation and coding scheme (MSC) field having an MCS value for each of first and second transport blocks (TBs); and
a transmitter configured to:
transmit the uplink grant to a subscriber station,
wherein, for each transport block, a combination of the respective MCS value corresponding to the respective transport block and a positive integer number of physical resource blocks allocated to the subscriber station (N_PRB) indicates whether the respective transport block is disabled, wherein the respective transport block is disabled if one of:
the N_PRB is greater than 1 and the MCS value corresponding to the transport block is set to 0, and
the N_PRB is 1 and the MCS value corresponding to the transport block is set to 28,
wherein the respective transport block is enabled if neither of:
the N_PRB is greater than 1 and the MCS value corresponding to the transport block is set to 0, nor
the N_PRB is 1 and the MCS value corresponding to the transport block is set to 28,
wherein the DCI format indicates a selected one of: both of the first and second TBs are enabled, the first TB is enabled and the second TB is disabled, and the first TB is disabled and the second TB is enabled.

2. The base station of claim 1, wherein if the N_PRB is 1, none of the MCS values of 29, 30, and 31 indicate retransmission.

3. The base station of claim 1, wherein a type of the uplink MIMO DCI format is a uplink MIMO DCI format 0B.

4. A method of operating a base station, the method comprising:
generating an uplink grant using an uplink multiple-input multiple-output (MIMO) downlink control information (DCI) format, the uplink MIMO DCI format comprising a modulation and coding scheme (MSC) field having an MCS value for each of first and second transport blocks (TBs); and
transmitting the uplink grant to a subscriber station,
wherein, for each transport block, a combination of the respective MCS value corresponding to the transport block and a positive integer number of physical resource blocks allocated to the subscriber station (N_PRB) indicates whether the respective transport block is disabled,
wherein the respective transport block is disabled if one of:
the N_PRB is greater than 1 and the MCS value corresponding to the transport block is set to 0, and
the N_PRB is 1 and the MCS value corresponding to the transport block is set to 28,
wherein the respective transport block is enabled if neither of:
the N_PRB is greater than 1 and the MCS value corresponding to the transport block is set to 0, nor
the N_PRB is 1 and the MCS value corresponding to the transport block is set to 28,
wherein the DCI format indicates a selected one of: both of the first and second TBs are enabled, the first TB is enabled and the second TB is disabled, and the first TB is disabled and the second TB is enabled.

5. The method of claim 4, wherein if the N_PRB is 1, none of the MCS values of 29, 30, and 31 indicate retransmission.

6. The method of claim 4, wherein a type of the uplink MIMO DCI format is a uplink MIMO DCI format 0B.

7. A subscriber station, comprising:
a receiver configured to:
receive an uplink grant in an uplink multiple-input multiple-output (MIMO) downlink control information (DCI) format, the uplink MIMO DCI format comprising a modulation and coding scheme (MSC) field having an MCS value for each of first and second transport blocks; and
a controller configured to:
determine whether each transport block is disabled based at least partly upon a combination of the MCS value corresponding to the respective transport block and a positive integer number of physical resource blocks allocated to the subscriber station (N_PRB),
wherein the respective transport block is disabled if one of:
the N_PRB is greater than 1 and the MCS value corresponding to the transport block is set to 0, and
the N_PRB is 1 and the MCS value corresponding to the transport block is set to 28,
wherein the respective transport block is enabled if neither of:
the N_PRB is greater than 1 and the MCS value corresponding to the transport block is set to 0, nor
the N_PRB is 1 and the MCS value corresponding to the transport block is set to 28,
wherein the DCI format indicates a selected one of: both of the first and second TBs are enabled, the first TB is enabled and the second TB is disabled, and the first TB is disabled and the second TB is enabled.

8. The subscriber station of claim 7, wherein a type of the uplink MIMO DCI format is a uplink MIMO DCI format 0B.

9. The subscriber station of claim 7, wherein if the N_PRB is 1, none of the MCS values of 29, 30, and 31 indicate retransmission.

10. A method of operating a subscriber station, the method comprising:
receiving an uplink grant in an uplink multiple-input multiple-output (MIMO) downlink control information (DCI) format, the uplink MIMO DCI format comprising a modulation and coding scheme (MSC) field having an MCS value for each of first and second transport blocks (TBs); and
determining whether each transport block is disabled based at least partly upon a combination of the respective MCS value corresponding to the transport block and a positive integer number of physical resource blocks allocated to the subscriber station (N_PRB),
wherein the respective transport block is disabled if one of:
the N_PRB is greater than 1 and the MCS value corresponding to the transport block is set to 0, and
the N_PRB is 1 and the MCS value corresponding to the transport block is set to 28,
wherein the respective transport block is enabled if neither of:
the N_PRB is greater than 1 and the MCS value corresponding to the transport block is set to 0, nor
the N_PRB is 1 and the MCS value corresponding to the transport block is set to 28,
wherein the DCI format indicates a selected one of: both of the first and second TBs are enabled, the first TB is enabled and the second TB is disabled, and the first TB is disabled and the second TB is enabled.

11. The method of claim 10, wherein a type of the uplink MIMO DCI format is a uplink MIMO DCI format 0B.

12. The method of claim 10, wherein if the N_PRB is 1, none of the MCS values of 29, 30, and 31 indicate retransmission.

* * * * *